United States Patent
Oda et al.

(10) Patent No.: US 7,172,342 B2
(45) Date of Patent: Feb. 6, 2007

(54) SEALING MEMBER AND ROLLING BEARING PROVIDED WITH THE SAME

(75) Inventors: Tetsuya Oda, Nara (JP); Takeshi Yamamoto, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 50 days.

(21) Appl. No.: 10/860,034

(22) Filed: Jun. 4, 2004

(65) Prior Publication Data

US 2005/0008273 A1    Jan. 13, 2005

(30) Foreign Application Priority Data

Jun. 6, 2003    (JP)    ............................ P.2003-161875

(51) Int. Cl.
*F16C 33/76*    (2006.01)
(52) U.S. Cl. .................................... 384/488
(58) Field of Classification Search ............... 388/488, 388/477, 484, 485, 486
See application file for complete search history.

(56) References Cited

U.S. PATENT DOCUMENTS

2005/0117826 A1*    6/2005    Kinno et al. ............. 384/477

FOREIGN PATENT DOCUMENTS

| JP | 10015487 A | 1/1998 |
|---|---|---|
| JP | 2953658 | 7/1999 |
| JP | 2000045078 A | 2/2000 |
| JP | 2002-357227 | 12/2002 |
| JP | 09229071 A | 9/2004 |

* cited by examiner

*Primary Examiner*—Lenard A. Footland
(74) *Attorney, Agent, or Firm*—McGinn IP Law Group, PLLC (57) ABSTRACT

A sealing member such as a shield plate or a seal that is attached to one of raceway rings of a rolling bearing and seals an annular space formed with the other raceway member includes a metal ring. The metal ring has a zinc plated layer on a surface thereof, and on a surface of the zinc plated layer an inorganic coating such as a lithium silicate coating is formed. When a coating amount of the inorganic coating is set or a way of forming the inorganic coating is controlled, the corrosion resistance and the workability same as or more than that in the case where the chromate layer is formed can be obtained.

20 Claims, 6 Drawing Sheets

SEALING MEMBER AND ROLLING BEARING PROVIDED WITH THE SAME

BACKGROUND OF THE INVENTION

The present invention relates to a sealing member such as a shield plate and a seal, and a rolling bearing provided with the sealing member.

In an existing rolling bearing, in particular, a ball bearing, in order to seal grease in an annular space between inner and outer rings, a sealing member such as a shield plate or a seal is provided.

The shield plate is a non-contact sealing member that is made of a metal ring of a steel sheet, normally attached to an outer ring, and faces an outer peripheral surface of an inner ring with a slight gap. The seal includes a metal ring and an elastic member such as rubber connected to at least part of the metal ring as a core rod. Of the seals, there are a contact type in which an elastic member elastically comes into sliding contact with an outer peripheral surface of an inner ring and a non-contact type in which an elastic member forms a labyrinth with an outer peripheral surface of an inner ring. Either sealing member is provided with a metal ring as a major portion.

In a metal ring of this kind of sealing member, so far, with rust prevention purpose, a zinc plated layer is formed according to zinc plating process. A coating (chromate coating) is formed on the surface of the zinc plated layer according to chromate treatment. As a protective film, an organic coating of such as a synthetic resin or an inorganic coating is disposed on the surface of the chromate coating (JP-A 2002-357227). The chromate coating works so as to improve the adhesiveness of the protective film to the zinc plated layer.

However, in the metal ring, hexavalent chromium that is an environmental load substance is contained in its coating. Accordingly, owing to problems such as the environmental contamination, it will be totally inhibited from using in future.

In this connection, the invention described in JP-A 2002-357227 proposes to form on a surface of a metal ring a coating according to chromate treatment of trivalent chromium or other plating layer, and thereby omitting the chromate coating containing hexavalent chromium.

However, in the case of a chromate coating containing hexavalent chromium being omitted, it is inevitable that the adhesiveness and the bonding ability of a protective film to a zinc plated layer in a lower layer are deteriorated. Accordingly, in the case of a metal ring having a predetermined shape being manufactured according to the press working or the like from a tabular steel sheet that is a raw material, the protective film peels at various portions of the metal ring, thereby resulting in deteriorating the workability. Furthermore, owing to occurrence of peeling and crack at various portions of the metal ring, rust becomes likely to occur and the corrosion resistance is deteriorated.

In the case a coating according to the chromate treatment of trivalent chromium is disposed, the trivalent chromium may cause an oxidation reaction with time to change to hexavalent chromium; accordingly, the environmental contamination may be caused.

SUMMARY OF THE INVENTION

The present invention aims, without providing a chromate coating of hexavalent chromium, for obtaining the corrosion resistance and the workability same as or more than that in a case having the chromate coating.

A first one of the present inventions, in order to achieve the above objects, relates to a sealing member that is attached to one of a pair of raceway members supported relatively rotatably through a plurality of rolling elements and seals an annular space formed between opposing portions of the raceway members, wherein the sealing member includes a metal ring, the metal ring has a zinc plated layer on a surface thereof, and on a surface of the zinc plated layer an inorganic coating is directly coated.

Thus constituted sealing member has only to be one that includes a metal ring and seals an annular space formed between opposing portions of a pair of raceway members. That is, the sealing member may be a non-contact shield plate made of a metal ring alone, or a seal in which with a metal ring as a core metal an elastic member such as rubber is joined to part thereof.

According to the above configuration, since the metal ring of the sealing member neither contains hexavalent chromium nor trivalent chromium that may change to hexavalent chromium with time, the environmental contamination is not likely to be caused. From a viewpoint of a manufacturing process, a step of chromic acid treatment can be omitted; accordingly, it advantageously reduces the cost.

In addition to the above, according to tests of such as the corrosion resistance carried out by the present inventors, owing to setting of a coating amount of an inorganic coating, the corrosion resistance and the workability same as or more than that in a case having a chromate coating can be obtained.

As to the inorganic coating, as an embodiment according to the first invention, it is preferable that the inorganic coating is a coating mainly made of silicon and a coating amount thereof is in the range of 200 to 550 mg/m$^2$.

When the coating amount of an inorganic coating mainly made of silicon exceeds the above range, the workability is deteriorated, that is, when press working is applied, the inorganic coating becomes likely to suffer the peeling and cracks. When a coating amount of the inorganic coating does not reach the above range, the performance as the protective film of the inorganic coating is deteriorated and rust occurs at an early stage, resulting in deterioration of the corrosion resistance.

As a more preferable embodiment of the first invention, an embodiment in which an inorganic coating is a lithium silicate coating and a coating amount thereof is in the range of 250 to 550 mg/m$^2$ can be cited. According to the configuration, the corrosion resistance can be improved. In the case of the embodiment, the lithium silicate coating is preferably formed, not according to an immersion method, but according to coating of a coating solution under pressure by means of a roll coater.

An optimum embodiment of the first invention is a case where an inorganic coating is a lithium silicate coating and a coating amount thereof is in the range of 250 to 450 mg/m$^2$. In the configuration, when the lithium silicate coating is being formed, even when pressurization of the coating solution is insufficient, excellent workability and corrosion resistance can be obtained.

A sealing member having the above configuration can be applied, without restricting to a ball bearing and a cylindrical roller bearing, to a rolling bearing where grease is sealed in an annular space formed between opposing portions of a pair of raceway members. The rolling bearing includes one that makes use of a shaft that is inserted inside of a bearing as an inner ring and one that makes use of an inner peripheral surface of a housing to which a bearing is attached as a raceway surface of outer ring. That is, it is not necessarily restricted to the rolling bearing that has inner and outer rings.

In addition to the above, the metal ring in the above configuration includes, other than one that is made of a steel sheet, ones that are made of plate materials of simple metals or various kinds of alloys such as a stainless-steel sheet, an aluminum sheet, and an aluminum alloy sheet. Furthermore, the zinc plated layer may be any plated layer as far as it contains zinc as a primary component. In the zinc plated layers, other than a plated layer obtained by electroplating a zinc simple body, plated layers obtained by electroplating zinc alloys such as a zinc/nickel alloy, a zinc/iron alloy and a zinc/cobalt/molybdenum alloy are included, and furthermore zinc hot dip galvanizing plated layer and alloyed zinc hit dip galvanizing plated layer are also included.

A second of the inventions relates to a rolling bearing, the rolling bearing including a pair of raceway rings that oppose each other; a plurality of rolling elements disposed between opposing portions of the raceway rings; and a sealing member that seals an annular space formed between opposing portions of the raceway rings, wherein the sealing member is a sealing member described in the first of the invention.

According to the rolling bearing having the above configuration, environmental contamination due to hexavalent chromium becomes unlikely to occur, and in manufacturing a sealing member, by omitting chromic acid treatment the cost reduction can be attained. Moreover, in the sealing member, by appropriately setting a coating amount of the inorganic coating, the corrosion resistance and the workability same as or more than that in the case having the chromate coating can be obtained; accordingly, as the grease-sealed rolling bearing, it can be used for a long time.

DETAILED DESCRIPTION OF PREFERRED EMBODIMENTS

Figure 1:
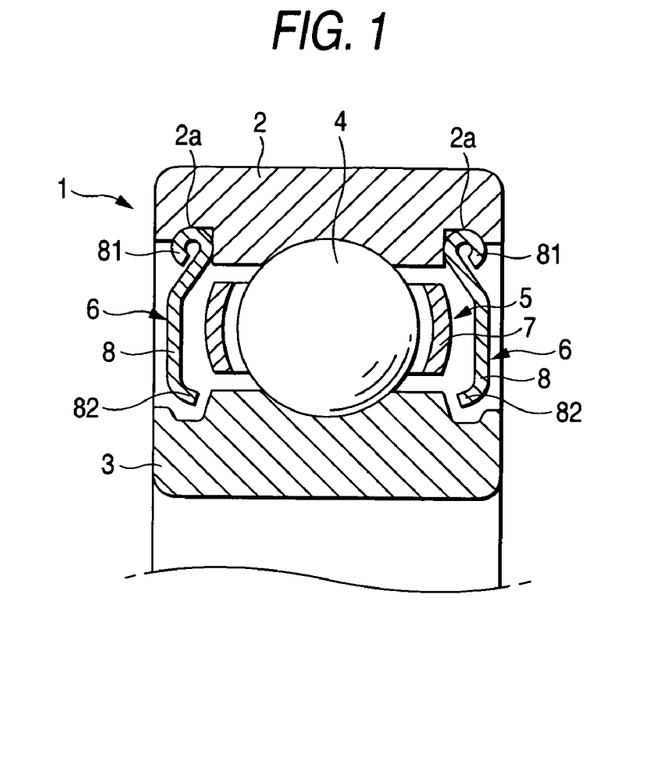
FIG. 1 is a sectional diagram of a ball bearing provided with a shield plate involving one embodiment of the present invention.
Figure 2:
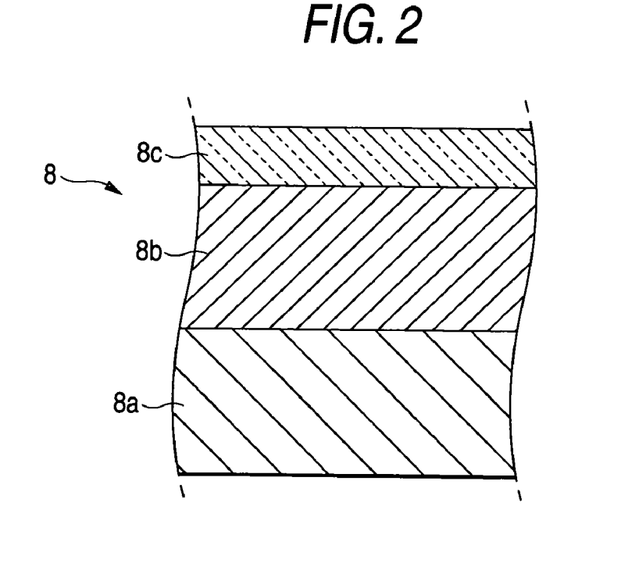
FIG. 2 is an enlarged sectional view of a surface portion of a shield plate of FIG. 1.
Figure 3:
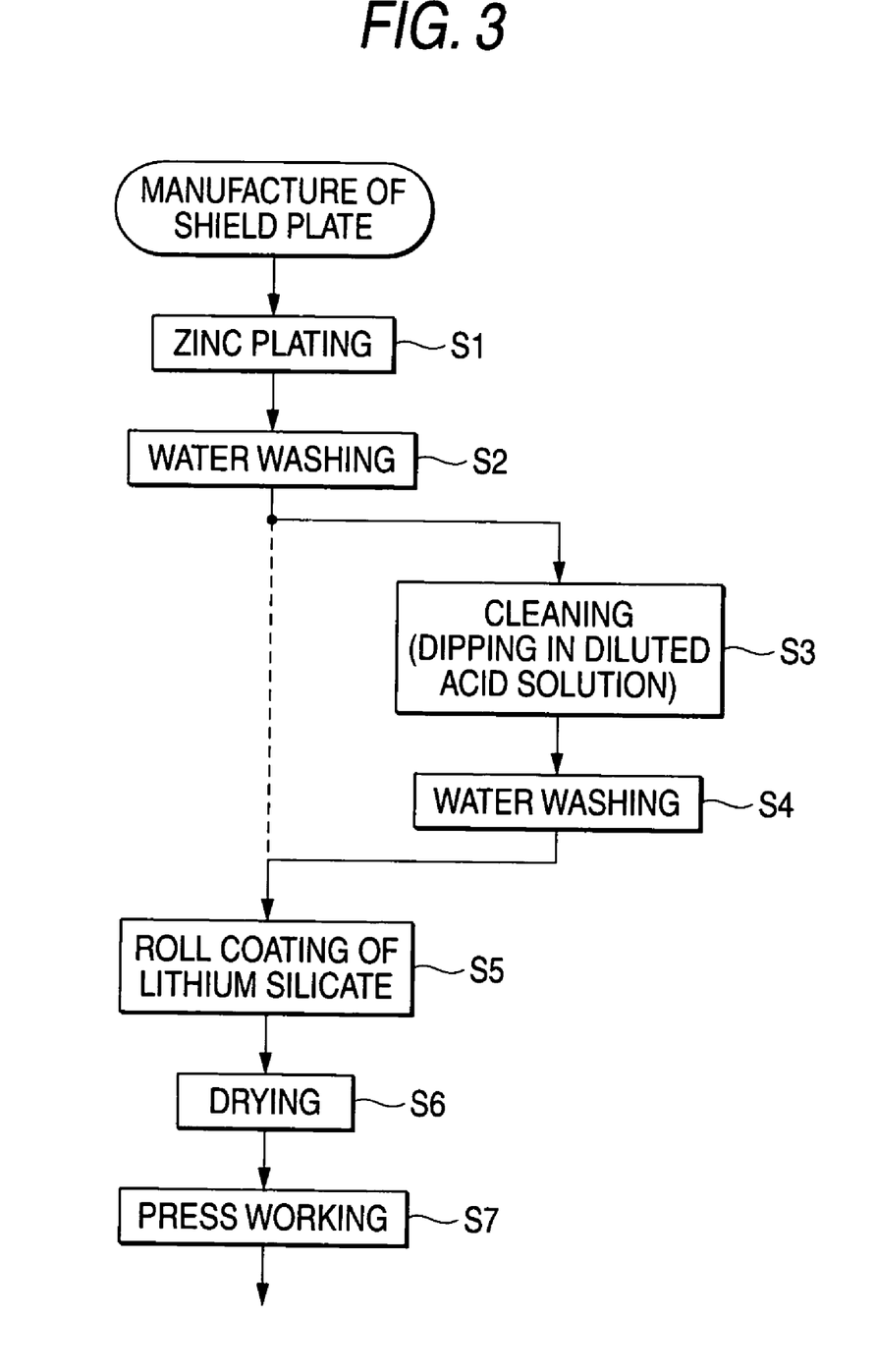
FIG. 3 is a process diagram showing a manufacturing process of the shield plate of FIG. 1.

The present invention will be explained with reference to the drawings. FIGS. 1 through 7 relate to one embodiment of the invention. FIG. 1 is a sectional view of a ball bearing provided with a shield plate according to the invention, FIG. 2 is an enlarged sectional view of a surface portion of a shield plate of FIG. 1, FIG. 3 is a process diagram showing a manufacturing process of the shield plate of FIG. 1; and all of FIGS. 4 through 7 are characteristic diagrams showing test results of the shield plate of FIG. 1.

As shown in FIG. 1, a ball bearing 1 according to the present embodiment includes an outer ring 2 and an inner ring 3 that are a pair of opposing raceway rings, a plurality of balls 4 as rolling elements disposed between opposing portions of these inner and outer rings 2 and 3, a shield plate 6 as a sealing member that seals an annular space 5 formed between the opposing portions of the inner and outer rings 2 and 3, and a cage 7 for holding the balls 4, wherein in the annular space 5 between the inner and outer rings 2 and 3, grease is sealed.

The shield plate 6 is made of a metal ring 8 that is manufactured by applying processing such as press working and winding up to a steel sheet 8a which is a raw material. In the metal ring 8, an attachment portion 81 to the outer ring 2 is formed by bending an outer periphery portion thereof into an arc in section over an entire circumference, and a proximity portion 82 that comes close to an outer periphery surface of the inner ring 3 with a slight gap left is formed in an inner periphery portion thereof. The attachment portion 81 of the metal ring 8 is engaged to an attaching recess 2a formed in an inner peripheral portion of the outer ring 2.

The present invention is characterized in that the metal ring 8 constituting a shield plate 6 that is a sealing member is improved in a structure of a surface portion of the metal ring 8 so that without providing a chromate coating of hexavalent chromium the characteristics such as the corrosion resistance and the workability same as or more than that in the case having the chromate coating can be obtained.

That is, as shown in an enlarged sectional view of FIG. 2, a zinc plated layer 8b is formed on a surface portion of a steel sheet 8a that is a raw material of the metal ring 8 according to zinc plating such as the electro-plating and hot-dip plating of zinc simple body or zinc alloy. A coating mainly made of silicon as an inorganic coating is directly formed on a surface of the zinc plated layer 8b. In the present embodiment, a lithium silicate coating 8c is directly formed on the surface.

The zinc plated layer 8b may have a thickness same as that of an existing one, that is, is not particularly restricted in its thickness. A coating amount of the lithium silicate coating 8c, owing to reasons described later, has to be in the range of 200 to 550 mg/m$^2$. More preferably, it has only to be in the range of 250 to 550 mg/m$^2$. The optimum coating amount is in the range of 250 to 450 mg/m$^2$.

According to the above configuration, the metal ring 8 of the shield plate 6 contains neither hexavalent chromium nor trivalent chromium; accordingly, the environmental contamination is not likely to be caused. From a viewpoint of manufacturing process, chromate treatment can be omitted.

Furthermore, according to the present inventors' tests of the corrosion resistance and the workability of products according to the present embodiment, it is found that when a coating amount of the lithium silicate coating 8c is appropriately set or a way by which the lithium silicate coating 8c is formed is controlled, the corrosion resistance and the workability same as or more than that of the case that has the chromate coating can be obtained.

In order to clarify the above fact, firstly, a method of manufacturing a shield plate 6 according to the present embodiment will be explained. As shown in a process diagram shown in FIG. 3, a zinc plated layer 8b and a lithium silicate coating 8c are formed on a surface portion of the steel sheet 8a in the state that a steel sheet 8a that is a raw material of a metal ring 8 is in a state of a plane table or a long plate material. Thereafter, the steel sheet 8a having the zinc plated layer 8b and the lithium silicate coating 8c is subjected to mechanical working such as the press working, and thereby an annular metal ring 8 having an attachment portion 81 and a proximity portion 82 is manufactured.

In more detail, a process of step S1 to step S6 of FIG. 3 is a surface treatment process to the steel sheet 8a that is a plane table or a long plate material. In the step S1, according to the electroplating or the hot dipping, a zinc plated layer 8b is formed on a surface portion of the steel sheet 8a, followed by washing with water as a after treatment in the step S2.

After the water washing in the step S2, according the step SS a lithium silicate coating 8c may be formed. However, in order to improve the adhesiveness between the zinc plated layer 8b and the lithium silicate coating 8c, a cleaning step in the steps S3 and S4 is preferably performed.

In the step s3, the steel sheet 8a that has the zinc plated layer 8b is immersed in a diluted acidic solution such as a 0.1% sulfuric acid solution at normal temperature of substantially 15 to 40 degree centigrade for 3 to 6 seconds to activate a surface of the zinc plated layer 8b. In the next step S4 water washing is applied.

In the step S5, a solution of lithium silicate is coated on a surface of the zinc plated layer 8b under pressure by means of a roll coater, followed by drying the coated solution in the next step S6. Thereby, the solution of lithium silicate is solidified on a surface of the zinc plated layer 8b to form a vitreous lithium silicate coating 8c.

In the step S7, mechanical processing such as the press working is applied to the steel sheet 8a on a surface on which the zinc plated layer 8b and the lithium silicate coating 8c are thus formed. Thereby, a shield plate 6 made of an annular metal ring 8 that has an attachment portion 81 and a proximity portion 82 at an outer peripheral portion and an inner peripheral portion, respectively, is manufactured.

With samples obtained by variously varying a coating amount of the lithium silicate coating 8c of the shield plate 6 of the present embodiment obtained according to the above process, tests of the corrosion resistance and the press workability were carried out, and thereby test results as shown in "coating amount/performance judgment table" of Table 1 were obtained. The corrosion resistance was evaluated by applying a salt spray test according to JIS-Z2371 and by investigating occurrence time of rust (red rust that is rust of iron and white rust that is rust of zinc). As to the press workability, the metal ring 8 was subjected to 90° bending, a processed surface thereof was observed with an electron microscope, and thereby the frequency of occurrence of cracks was investigated.

In the shield plate 6 according to the embodiment, a coating solution is coated under pressure by means of a roll coater to form the lithium silicate coating 8c. However, in Table 1, test results of the press workability in the case of the lithium silicate coating 8c being formed by dipping in a coating solution are also shown.

TABLE 1

Coating amount/performance judgment table

| | Coating amount of lithium silicate (mg/m$^2$) | | | | | |
|---|---|---|---|---|---|---|
| | 0 to 200 | 200 to 250 | 250 to 350 | 350 to 450 | 450 to 550 | 550 to 600 |
| Corrosion resistance | X | Δ | ⊙ | ⊙ | ⊙ | ⊙ |
| Press workability (coating by roller coater) | ⊙ | ⊙ | ⊙ | ⊙ | ⊙ | ○ |
| Corrosion resistance after press working | X | Δ | ⊙ | ⊙ | ⊙ | Δ |
| Judgment | X | ○ | ⊙ | ⊙ | ⊙ | Δ |
| Press workability (coating due to dipping) | ⊙ | ⊙ | ⊙ | Δ | X | X |

⊙ - very good,
○ - good,
Δ - fair,
X - bad

According to test results of Table 1, it is found that when the coating amount of the lithium silicate coating 8c is less than 200 mg/m$^2$, the corrosion resistance is bad, and when it exceeds 550 mg/m$^2$, the corrosion resistance after the press working is problematic. In short, the coating amount of lithium silicate coating 8c has only to be in the range of 200 to 550 mg/m$^2$.

It is found that when the coating amount is in a more limited range, that is, in the range of 250 to 550 mg/m$^2$, as far as the lithium silicate coating 8c is formed by use of a roll coater, both of the corrosion resistance and the press workability are very good.

Furthermore, it is found that in the case of the coating amount being in the range of 250 to 450 mg/m$^2$, even when the lithium silicate coating 8c is formed by use of dipping, a practically applicable level of press workability can be obtained. From this, it is found that in the case of the lithium silicate coating 8c being formed by use of a roll coater, even when pressurization of the coating solution being insufficient in forming the coating, excellent press workability and the corrosion resistance can be obtained.

Furthermore, from the results shown in Table 1, it is found that in the case of the lithium silicate coating 8c being formed by means of the roll coater, the press workability is excellent more than that of one that is formed according to the dipping. This is considered because in the case of the lithium silicate coating 8c being formed by means of the roll coater, since a coating solution is coated on a zinc plated layer 8b under pressure, the lithium silicate coating 8c is brought into close contact with the zinc plated layer 8b, resulting in difficulty to peel off the zinc plated layer 8b.

Still furthermore, after preparing a lot of products to which the present embodiment is applied and that have a definite coating amount of the lithium silicate coating 8c, the present inventors carried out tests of the corrosion resistance and so on comparing with that of existing products that have a chromate coating. Results thereof are shown in FIGS. 4A through 7.

The existing products each have, other than the chromate coating, a lithium silicate coating on a surface side thereof and a coating amount thereof calculated from a film thickness is substantially 170 mg/m$^2$. The coating amount of the lithium silicate coating 8c of a product according to the embodiment was substantially 250 mg/m$^2$ that was larger by an amount enough to complement the corrosion resistance that the chromate coating had.

Figure 4A:
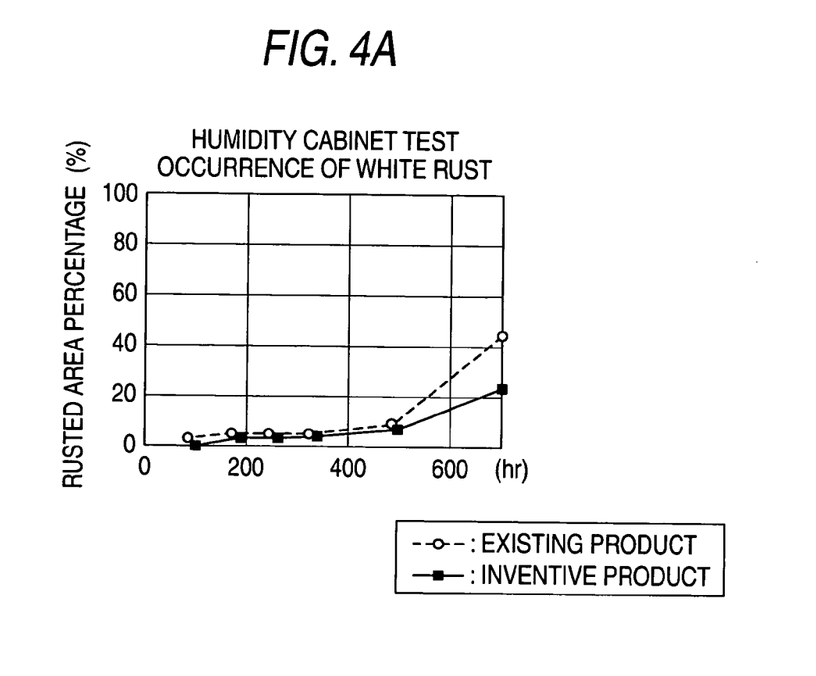
FIGS. 4A and 4B are characteristic diagrams showing results of the humidity cabinet test of the shield plate of FIG. 1, FIG. 4A showing occurrence time of white rust, FIG. 4B showing occurrence time of red rust.
Figure 4B:
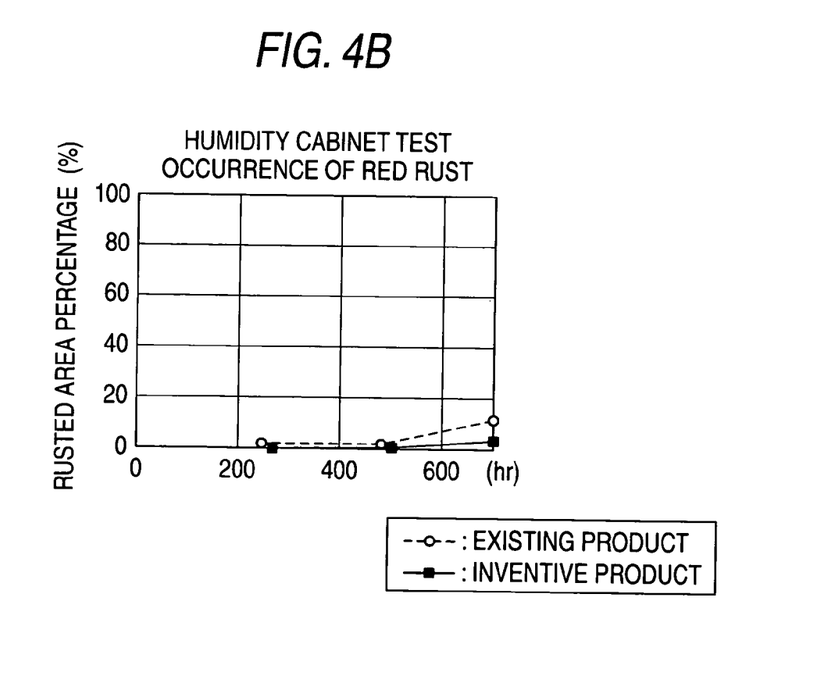

FIGS. 4A and 4B are characteristic diagrams showing results of the humidity cabinet test that is one of the corrosion resistance tests, FIG. 4A showing the occurrence time of white rust that is rust of zinc, FIG. 4B showing the occurrence time of red rust that is rust of iron. The humidity cabinet test conforms to JIS-K2246 and a sample was left in a wet atmosphere of 95% humidity or more at 49 degree centigrade.

As to the white rust, it is found that both the inventive product and the existing product developed the rust in a substantially same time zone; however, after a long time (600 to 700 hr), the occurrence frequency of the white rust was smaller in the inventive product than in the existing product. Also as to the red rust, the rusting occurred in a substantially same time zone; however, after a long time, the occurrence frequency of the red rust of the inventive product was lower.

Figure 5A:
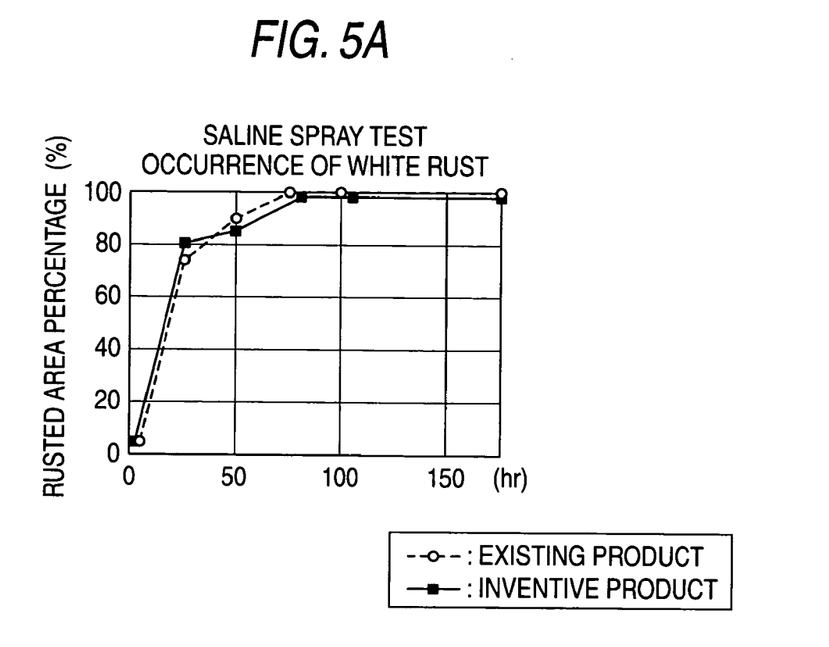
FIGS. 5A and 5B are characteristic diagrams showing results of the salt spray test of the shield plate of FIG. 1, FIG. 5A showing occurrence time of white rust, FIG. 5B showing occurrence time of red rust.
Figure 5B:
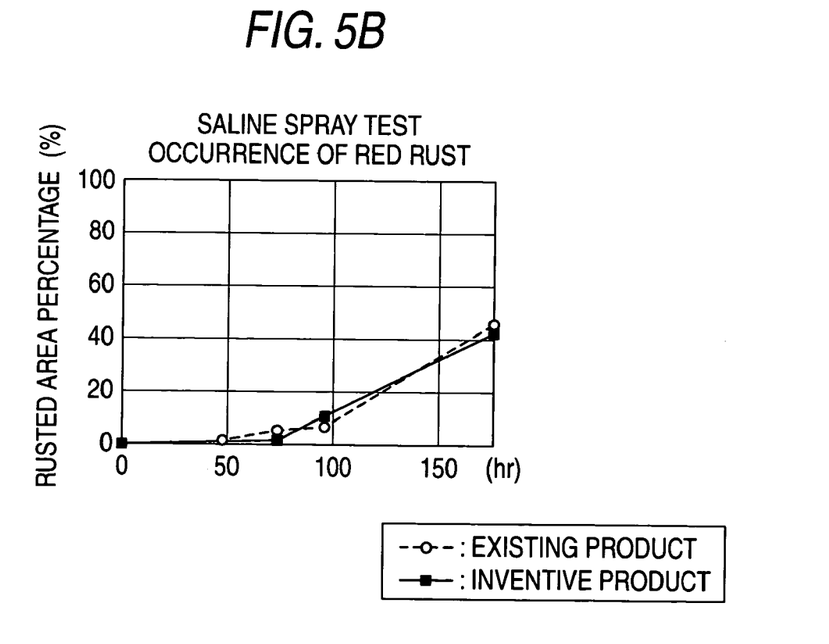

FIGS. 5A and 5B are characteristic diagrams showing results of the salt spray test that is one of the corrosion resistance tests, FIG. 5A showing occurrence time of the white rust, FIG. 4B showing occurrence time of the red rust. The salt spray test conforms to JIS-Z2371 and an aqueous solution of 5% sodium chloride was sprayed to a sample in an atmosphere set at 35 degree centigrade.

From results shown in FIGS. 5A and 5B, it is found that the inventive product and the existing product exhibited a substantially same occurrence mode of the white rust as well as of the red rust.

Figure 6A:
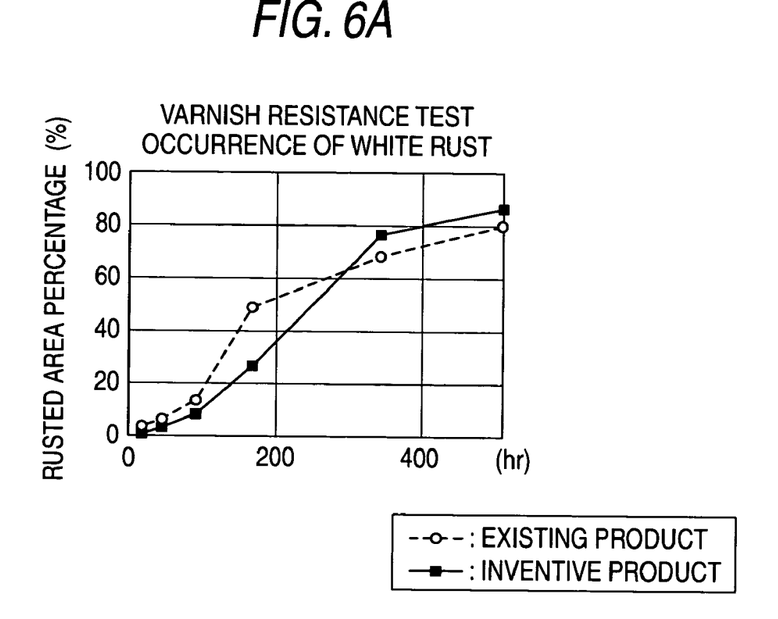
FIGS. 6A and 6B are characteristic diagrams showing results of the varnish resistance test of the shield plate of FIG. 1, FIG. 6A showing occurrence time of white rust, FIG. 6B showing occurrence time of red rust.
Figure 6B:
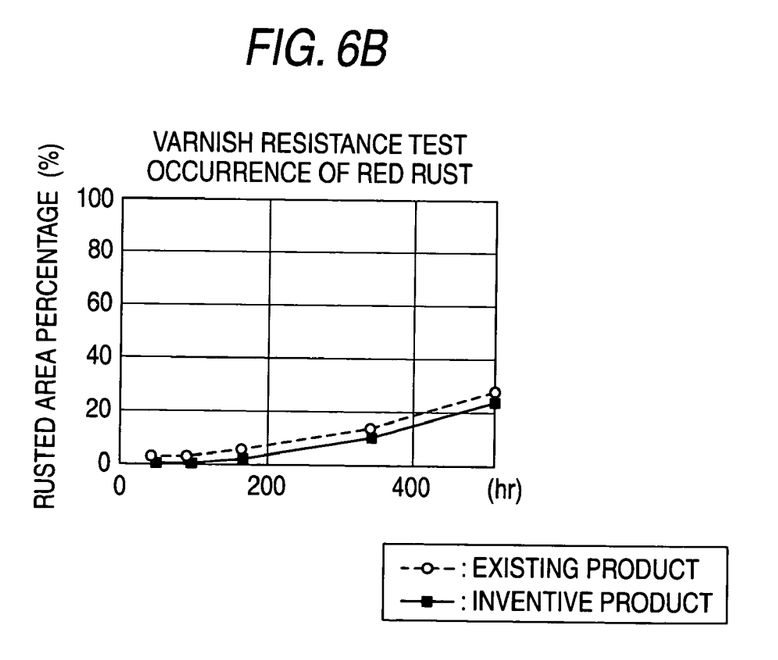

FIGS. 6A and 6B are characteristic diagrams showing results of the varnish resistance test that is one of the corrosion resistance tests, FIG. 6A showing occurrence time of the white rust, FIG. 4B showing occurrence time of the red rust. Since the varnish is used in a coil portion and so on of a motor, the sealing member such as a shield plate of a rolling bearing is much in chance of coming into contact with the varnish. In the varnish resistance test, a sample was left in an atmosphere where water and varnish were present together and repeatedly subjected to a heat cycle of at 60 degree centigrade for 10 hr and at room temperature for 14 hr.

The white rust exhibited slightly different occurrence modes between the inventive product and the existing product; however, after a long time (500 hr), the occurrence rate of the white rust of the inventive product was substantially same as that of the existing product. As to the red rust, both the inventive product and the existing product exhibited substantially same occurrence mode.

Figure 7:
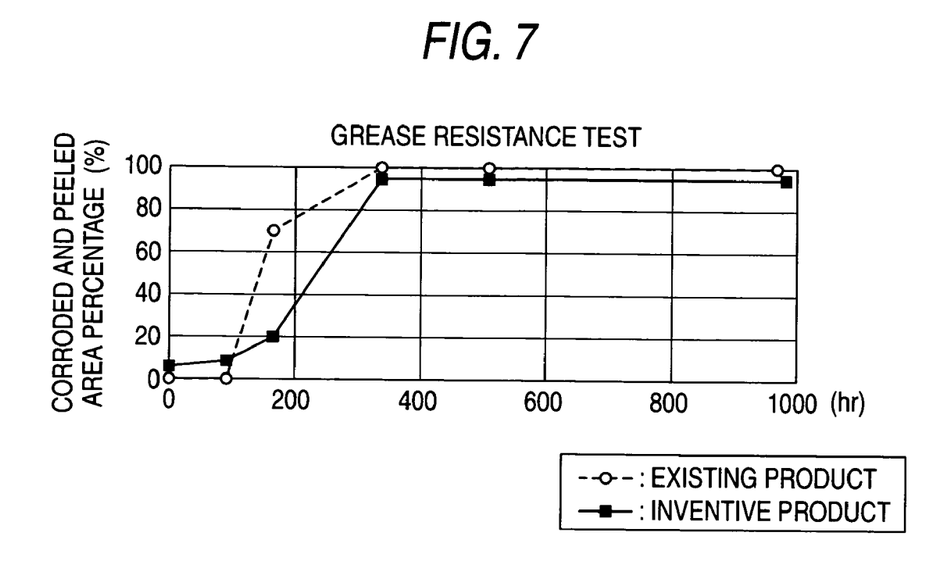
FIG. 7 is a characteristic diagram showing results of the grease resistance test of the shield plate of FIG. 1.

FIG. 7 is a characteristic diagram showing results of the grease resistance test. In the grease resistance test, after dipping in grease, a sample is heated to 180 degree centigrade followed by investigating extents of corrosion and peeling. From results of FIG. 7, after substantially 300 hr, in both of the inventive product and the existing product, the corrosion and the peeling spread all over the sample; however, up to this Lime, the inventive product is less in the occurrence of the corrosion and the peeling than in the existing product.

In short, from test results shown in FIGS. 4A through 7, it is found that the inventive products have the corrosion resistance and the grease resistance excellent same as or slightly more excellent than that of the existing products that have the chromate coating.

Figure 8:
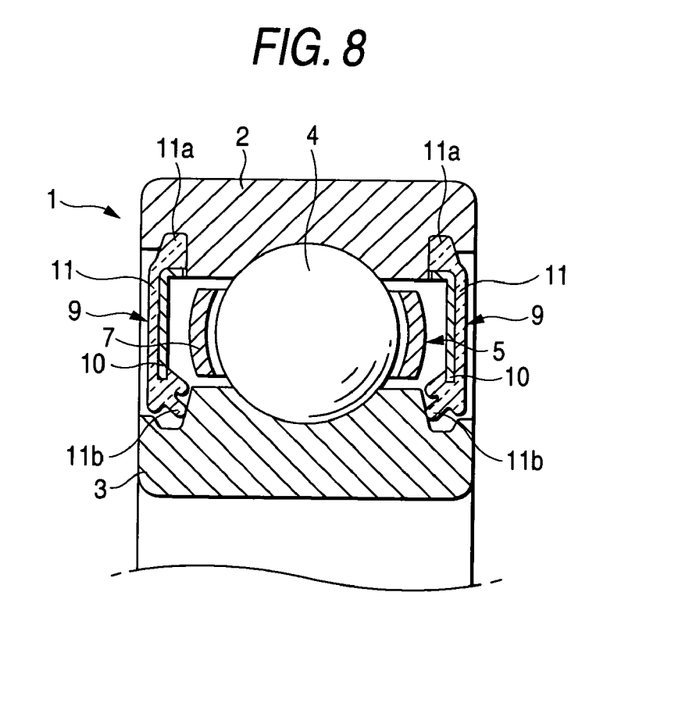
FIG. 8 is a sectional view of a ball bearing provided with a seal involving another embodiment of the invention.

The present invention, without restricting to the shield plate 6, as shown in FIG. 8, can be also applied to other types of sealing members that are provided with a metal ring and seals an annular space formed between opposing portions of a pair of raceway members. FIG. 8 is a sectional view of a ball bearing provided with a seal according to another embodiment of the present invention.

In FIG. 8, reference numeral 1 denotes the whole of a ball bearing and reference numeral 9 denotes a seal. The seal 9 is usually constituted, with a metal ring 10 made of a steel sheet as a core metal, by connecting an elastic member 11 such as a rubber to part of the metal ring. The elastic member 11 is mainly connected to an outer surface side of the metal ring 10, to an outer periphery side thereof an attachment portion 11a to an outer ring 2 is formed, and to an inner periphery side thereof a sliding contact portion 11b that comes into sliding contact with an outer periphery surface of an inner ring 3 is formed. An inner surface of the metal ring 10 is exposed to an annular space 5 between the inner and outer rings 2 and 3. Other configuration is same as the ball bearing 1 shown in FIG. 1, and corresponding portions are given reference numerals same as FIG. 1.

A metal ring 10 of the seal 9, though not particularly shown in the drawing, similarly to a surface portion shown in FIG. 2, on a surface portion of a steel sheet that is a raw material, is provided with a zinc plated layer according to the electroplating of zinc or hot dipping of zinc, and on a surface portion of the zinc plated layer an inorganic coating mainly made of silicon, for instance, a lithium silicate coating is directly formed thereon.

According to the configuration of the surface portion, the metal ring 10 of the seal 9, in spite of not having the chromate coating, has the characteristics such as the corrosion resistance and the workability same as or more than the case having the chromate coating.

According to the present invention, the metal ring of the sealing member, not having the chromate coating, is not likely to cause the environmental contamination and has the corrosion resistance and the workability same as or more than the case having the chromate coating.

What is claimed is:

1. A sealing member that is attached to one of a pair of raceway members supported freely rotatably through a plurality of rolling elements and seals an annular space formed between opposing portions of the raceway members, the sealing member comprising:
   a metal ring;
   a zinc plated layer formed on a surface of the metal ring; and an inorganic coating directly formed on a surface of the zinc plated layer, wherein a coating amount of the inorganic coating is in a range of 200 to 550 mg/m².

2. The sealing member according to claim 1, wherein the inorganic coating is a coating mainly made of silicon.

3. The sealing member according to claim 1, wherein the inorganic coating includes lithium silicate coating.

4. The sealing member according to claim 3, wherein a coating amount of the lithium silicate coating is in a range of 250 to 450 mg/m².

5. The sealing member according to claim 3, wherein a coating amount of the lithium silicate coating is in a range of 250 to 550 mg/m².

6. A rolling bearing comprising:
a pair of raceway rings that oppose each other;
a plurality of rolling elements disposed between opposing portions of the raceway rings; and
a sealing member that seals an annular space formed between the opposing portions of the raceway rings, the sealing member including,
a metal ring,
a zinc plated layer formed on a surface of the metal ring, and
an inorganic coating directly formed on a surface of the zinc plated layer,
wherein a coating amount of the inorganic coating is in a range of 200 to 550 mg/m².

7. The roller bearing according to claim 6, wherein the inorganic coating includes lithium silicate coating.

8. The roller bearing according to claim 7, wherein a coating amount of the lithium silicate coating is in a range of 250 to 450 mg/m².

9. The rolling bearing according to claim 7, wherein the rolling bearing is used in a motor.

10. The rolling bearing according to claim 7, wherein a coating amount of the lithium silicate coating is in a range of 250 to 550 mg/m².

11. The rolling bearing according to claim 6, wherein the inorganic coating is a coating mainly made of silicon.

12. A sealing member that is attached to one of a pair of raceway members supported freely rotatably through a plurality of rolling elements and seals grease in an annular space formed between opposing portions of the raceway members, the sealing member comprising:

a metal ring;
a zinc plated layer formed on a surface of the metal ring; and
an inorganic coating directly formed on a surface of the zinc plated layer,
wherein a coating amount of the inorganic coating is in range of 220 to 550 mg/m², and
wherein the sealing member is heated when used.

13. The sealing member according to claim 12, wherein the inorganic coating is a coating mainly made of silicon.

14. The sealing member according to claim 12, wherein the inorganic coating includes lithium silicate coating.

15. The sealing member according to claim 14, wherein a coating amount of the lithium silicate coating is in a range of 250 to 550 mg/m².

16. The sealing member according to claim 14, wherein a coating amount of the lithium silicate coating is in a range of 250 to 450 mg/m².

17. A rolling bearing comprising:
a pair of raceway rings that oppose each other;
a plurality of rolling elements disposed between opposing portions of the raceway rings; and
a sealing member that seals grease in an annular space formed between the opposing portions of the raceway rings, the sealing member comprising:
a metal ring;
a zinc plated layer formed on a surface of the metal ring; and
an inorganic coating directly formed on a surface of the zinc plated layer,
wherein a coating amount of the inorganic coating is in a range of 200 to 550 mg/m², and
wherein the rolling bearing is heated when used.

18. The rolling bearing according to claim 17, wherein the inorganic coating is a coating mainly made of silicon.

19. The rolling bearing according to claim 17, wherein the inorganic coating includes lithium silicate coating.

20. The rolling bearing according to claim 19, wherein a coating amount of the lithium silicate coating is in a range of 250 to 450 mg/m².

* * * * *